United States Patent
Sano et al.

(10) Patent No.: US 8,439,463 B2
(45) Date of Patent: May 14, 2013

(54) IMAGE-FORMING METHOD AND RECORD

(75) Inventors: Tsuyoshi Sano, Shiojiri (JP); Takayoshi Kagata, Shiojiri (JP); Akio Ito, Chino (JP)

(73) Assignee: Seiko Epson Corporation (JP)

( * ) Notice: Subject to any disclaimer, the term of this patent is extended or adjusted under 35 U.S.C. 154(b) by 388 days.

(21) Appl. No.: 12/707,045

(22) Filed: Feb. 17, 2010

(65) Prior Publication Data

US 2010/0207973 A1 Aug. 19, 2010

(30) Foreign Application Priority Data

Feb. 18, 2009 (JP) ................................ 2009-034905

(51) Int. Cl.
*B41J 29/38* (2006.01)
*G01D 11/00* (2006.01)

(52) U.S. Cl.
USPC .............................................. 347/6; 347/100

(58) Field of Classification Search ................ 347/6, 96, 347/98, 100
See application file for complete search history.

(56) References Cited

U.S. PATENT DOCUMENTS

| | | | |
|---|---|---|---|
| 6,439,708 B1 * | 8/2002 | Kato et al. ....................... | 347/98 |
| 6,877,850 B2 * | 4/2005 | Ishimoto et al. .............. | 347/100 |
| 7,134,749 B2 * | 11/2006 | Ben-Zur et al. ................ | 347/101 |
| 7,244,021 B2 * | 7/2007 | Arai .............................. | 347/102 |
| 7,296,883 B2 | 11/2007 | Kanaya et al. | |
| 7,419,255 B2 | 9/2008 | Kawaguchi et al. | |
| 2001/0020964 A1 * | 9/2001 | Irihara et al. .................... | 347/43 |
| 2003/0234848 A1 * | 12/2003 | Ishikawa ....................... | 347/102 |
| 2005/0250876 A1 | 11/2005 | Kawaguchi et al. | |

FOREIGN PATENT DOCUMENTS

| | | |
|---|---|---|
| CN | 1592775 A | 3/2005 |
| CN | 1865363 A | 11/2006 |
| JP | 2005-161583 A | 6/2005 |

OTHER PUBLICATIONS

Patent English Abstract of Chinese Application 1865363A Published Nov. 22, 2006.
Patent English Abstract of Chinese Application 1592775A Published Mar. 9, 2005.
English Abstract of Japanese Application No. 2005-161583 A Published Jun. 23, 2005.

* cited by examiner

*Primary Examiner* — An Do
(74) *Attorney, Agent, or Firm* — Harness, Dickey & Pierce, P.L.C.

(57) ABSTRACT

An image-forming method includes a first image-forming step of forming an image on a fabric with a first ink composition and a second image-forming step of forming an image on the fabric with a second ink composition subsequently to the first image-forming step. The first ink composition contains a first colorant. The second ink composition contains a second colorant. The first colorant has an average particle size less than that of the second colorant.

17 Claims, No Drawings

IMAGE-FORMING METHOD AND RECORD

BACKGROUND

1. Technical Field

The present invention relates to image-forming methods capable of forming images having good hiding power on fabric. The present invention particularly relates to an image-forming method which is capable of forming an image having good hiding power on a fabric and which is applicable to ink jet recording methods. Furthermore, the present invention relates to a record obtained by the image-forming method.

2. Related Art

Japanese Unexamined Patent Application Publication No. 2005-161583 discloses a method for forming a white ink jet image on a fabric by an ink jet recording process using a white ink jet ink containing fine hollow polymer particles serving as a white pigment. In the image-forming method, the fabric is subjected to printing several times by the ink jet recording process, is subjected to preliminary heat fixing at least once while being subjected to printing several times, and is subjected to final heat fixing after final printing. A print obtained by the image-forming method has sufficient visibility and high washing fastness.

However, the image-forming method has problems in that printing needs to be performed several times, the amount of ink used is large, and the time taken to form an image is long.

SUMMARY

An advantage of some aspects of the invention is to provide an image-forming method capable of forming an image, particularly a white image, having high hiding power on a fabric in a short time with a small amount of ink.

An image-forming method according to the present invention includes a first image-forming step of forming an image on a fabric with a first ink composition and a second image-forming step of forming an image on the fabric with a second ink composition subsequently to the first image-forming step. The first ink composition contains a first colorant. The second ink composition contains a second colorant. The first colorant has an average particle size less than that of the second colorant.

In the image-forming method, the first colorant is metal compound particles and the second colorant is hollow resin particles.

In the image-forming method, the metal compound particles have an average size of 200 nm or less.

In the image-forming method, the hollow resin particles have an average size of 500 nm or more.

In the image-forming method, the metal compound particles are made of titanium oxide.

In the image-forming method, the content of the first colorant in the first ink composition and the content of the second colorant in the second ink composition are 1% to 20% by mass.

In the image-forming method, the first and second ink compositions contain a dispersion containing a polyurethane resin.

In the image-forming method, the first and/or second image-forming step is performed under heating conditions.

In the image-forming method, the first and second ink compositions further contain at least one selected from the group consisting of alkanediols and glycol ethers.

In the image-forming method, the first and second ink compositions further contain an acetylene glycol surfactant or a polysiloxane surfactant.

The image-forming method is applicable to ink jet recording methods.

A record according to the present invention is obtained by the image-forming method.

According to present invention, an image is formed with a first ink composition containing a first colorant having a small average particle size and an image is formed with a second ink composition containing a second colorant having a large average particle size. Since the first colorant has a small average particle size, the first colorant more readily penetrates fibers of fabric than the second colorant. Therefore, an image with high hiding power can be efficiently formed with a small amount of ink in a short time in such a manner that the first colorant is caused to penetrate the fabric fibers and the second colorant is then applied to the fabric fibers. In particular, the image-forming method is suitable for forming a white image on a fabric sheet. When the first colorant is metal compound particles made of titanium oxide or the like and the second colorant is hollow resin particles, a white image having high hiding power can be formed. When the first and second ink compositions contain a polyurethane resin which is fixative, the first and second ink compositions have high fixability to the fabric sheet. The fixability of the first and second ink compositions to the fabric sheet can be increased in such a manner that the first and second ink compositions are applied to the fabric sheet under heating conditions.

DESCRIPTION OF EXEMPLARY EMBODIMENTS

An image-forming method according to the present invention includes a first image-forming step of forming an image on a fabric with a first ink composition and a second image-forming step of forming an image on the fabric with a second ink composition subsequently to the first image-forming step. The first ink composition contains a first colorant and the second ink composition contains a second colorant. The first colorant has an average particle size less than that of the second colorant.

The average particle size of the first colorant is less than that of the second colorant. The first and second colorants may have the same color or different colors. The first and second colorants preferably have the same color.

The first and second ink compositions are particularly suitable for forming white images having high hiding power on fabric. In a description below, the following example is used: an example in which a white image having high hiding power is formed on a fabric by the image-forming method using the first and second ink compositions, which are white ink compositions containing white colorants. The present invention is not limited to the example.

Metal compound particles and hollow resin particles are preferably used to form the white image on the fabric sheet by the image-forming method. The hollow resin particles, which are used for colorants, usually have an average particle size greater than that of pigment particles; hence, the first colorant and the second colorant are preferably the metal compound particles and the hollow resin particles, respectively. The metal compound particles preferably have an average size of 200 nm or less and the hollow resin particles preferably have an average size of 500 nm or more. This allows the white image, which has high hiding power, to be efficiently formed on the fabric.

The metal compound particles, the hollow resin particles, and components contained in the first and/or second ink composition are described below in detail. Components other than the first and second colorants can be commonly used for the first and second ink compositions.

The metal compound particles are not particularly limited and may be made of a metal-containing compound usable as a pigment. The metal compound particles are preferably made of a compound, such as a metal oxide, barium sulfate, or calcium carbonate, conventionally used as a white pigment. The metal oxide is not particularly limited and is preferably titanium dioxide, zinc oxide, silica, alumina, magnesium oxide, or the like. In particular, the metal compound particles are preferably made of titanium dioxide or alumina.

The content of the metal compound particles in the first ink composition is preferably 1% to 20% and more preferably 5% to 10% on a mass basis. When the content of the metal compound particles therein is greater than 20% by mass, ink jet recording heads are possibly clogged. This can cause a reduction in reliability. When the content of the metal compound particles therein is less than 1% by mass, the degree of whiteness is likely to be insufficient, that is, the hiding power of the white image is likely to be insufficient.

When the metal compound particles are contained in the first ink composition and used as a colorant, the metal compound particles preferably have an average size (outer diameter) of 200 nm or less and more preferably 20 to 100 nm in view of filling spaces between fibers in the fabric with the metal compound particles and in view of fixing the metal compound particles to the fibers.

The average size of the metal compound particles can be measured with a laser diffraction-scattering particle size distribution analyzer. A useful example of the laser diffraction-scattering particle size distribution analyzer is a dynamic light scattering particle size distribution analyzer, Microtrack UPA, available from Nikkiso Co., Ltd.

The hollow resin particles have internal pores and preferably have shells made of a resin having liquid permeability. This allows the internal pores to be filled with an aqueous medium when the hollow resin particles are present in an aqueous ink composition. The hollow resin particles filled with the aqueous medium have a density substantially equal to that of the aqueous medium and therefore can be stably dispersed in the aqueous ink composition without settling. This allows the aqueous ink composition to have high storage stability and ejection stability.

After the aqueous ink composition is applied to a recording medium, the aqueous medium is removed from the hollow resin particles during drying and therefore the internal pores become empty. When the hollow resin particles contain air, the hollow resin particles can exhibit a white color because the hollow resin particles have resin and air portions having different refractive indices and therefore effectively scatter incident light.

The hollow resin particles are not particularly limited and may be known ones. The hollow resin particles may be those disclosed in, for example, U.S. Pat. Nos. 4,880,465 or 3,562,754.

When the hollow resin particles are contained in the second ink composition and used as a white colorant, the hollow resin particles preferably have an average size (outer diameter) of 500 nm or more and more preferably 550 to 1,000 nm in view of achieving a good degree of whiteness.

The average size of the hollow resin particles can be measured with a laser diffraction-scattering particle size distribution analyzer. A useful example of the laser diffraction-scattering particle size distribution analyzer is a dynamic light scattering particle size distribution analyzer, Microtrack UPA, available from Nikkiso Co., Ltd.

The content (solid content) of the hollow resin particles in the second ink composition is preferably 1% to 20%, more preferably 5% to 20%, and further more preferably 8% to 15% on a mass basis. When the content (solid content) of the hollow resin particles therein is greater than 20% by mass, ink jet recording heads are possibly clogged. This can cause a reduction in reliability. When the content thereof is less than 1% by mass, the degree of whiteness is likely to be insufficient, that is, the hiding power of the white image is likely to be insufficient. In view of whiteness, the content of the hollow resin particles therein is preferably 5% by mass or more.

A process for preparing the hollow resin particles is not particularly limited. The hollow resin particles can be prepared by a known process. The hollow resin particles may be prepared by, for example, an emulsion polymerization process in which a vinyl monomer, a surfactant, a polymerization initiator, and an aqueous dispersion medium are mixed together in a nitrogen atmosphere and thereby a hollow resin particle emulsion is prepared.

Examples of the vinyl monomer include monofunctional vinyl monomers such as styrene, vinyl toluene, ethylene, vinyl acetate, vinyl chloride, vinylidene chloride, acrylonitrile, (meth)acrylamide, and (meth)acrylic esters. Examples of the (meth)acrylic esters include methyl acrylate, methyl methacrylate, ethyl (meth)acrylate, butyl (meth) acrylate, 2-hydroxyethyl methacrylate, 2-ethylhexyl (meth)acrylate, benzyl (meth)acrylate, lauryl (meth)acrylate, oleyl (meth) acrylate, palmityl (meth)acrylate, and stearyl (meth)acrylate.

Other examples of the vinyl monomer include bifunctional vinyl monomers such as divinyl benzene, allyl methacrylate, ethylene glycol dimethacrylate, 1,3-butanediol dimethacrylate, diethylene glycol dimethacrylate, and trimethylolpropane methacrylate. The hollow resin particles can be prepared in such a manner that one or more of the monofunctional vinyl monomers and one or more of the bifunctional vinyl monomers are copolymerized and the obtained copolymer is highly cross-linked. This allows the hollow resin particles to have light-scattering ability, heat resistance, solvent resistance, solvent dispersibility, and other properties.

The surfactant may be one capable of forming molecular aggregates such as micelles in water. Examples of the surfactant include anionic surfactants, nonionic surfactants, cationic surfactants, and amphoteric surfactants.

Examples of the polymerization initiator include known water-soluble compounds such as hydrogen peroxide and potassium persulfate.

Examples of the aqueous dispersion medium include water and a hydrophilic organic solvent-water mixture.

The first and second ink compositions preferably contain a resin dispersion containing particles of a polyurethane resin.

Preferred examples of the polyurethane resin include polycarbonate-based anionic polyurethane resins and polyether-based anionic polyurethane resins.

General polyurethane resins can be formed into flexible, tough films because molecules of the polyurethane resins are loosely linked to each other through hydrogen bonds. Since the polyurethane resin is fluidized at a temperature of 10° C. to 40° C., at which ink jet recording is usually performed, and spreads over a recording medium to form a flexible film, the use of the polyurethane resin allows an image having high fixability and rubfastness to be formed. Polycarbonate- or polyether-based polyurethane resins are readily formed into more flexible films as compared to those formed from polyester-based polyurethane resins and therefore are useful in forming images having high fixability and rubfastness. The polycarbonate- or polyether-based polyurethane resins have resistance to water and therefore are suitable for use in aqueous ink.

The polyurethane resin preferably has a glass transition temperature (Tg) of 50° C. or lower, more preferably 0° C. or lower, and further more preferably −10° C. or lower. When the polyurethane resin has a glass transition temperature of 50° C. or lower, the polyurethane resin spreads over a recording medium to form an image although the detailed reason for that is unclear. Therefore, the use of the polyurethane resin allows the hollow resin particles or the metal compound particles to be tightly fixed on the recording medium. This allows an image with high rubfastness to be obtained. In particular, when the polyurethane resin has a glass transition temperature of 0° C. or lower, the use of the polyurethane resin allows intermittent printability to be enhanced and prevents nozzle clogging during ink jet recording.

The dispersion, which contains the polyurethane resin dispersed in a solvent in the form of particles, is preferably used herein. Dispersions can be categorized into forcibly emulsified dispersions and self-emulsified dispersions. A forcibly emulsified dispersion and a self-emulsified dispersion can be used herein. In particular, the self-emulsified dispersion is preferably used herein. The self-emulsified dispersion is superior in film formability and water resistance to the forcibly emulsified dispersion and therefore can be used to form a water-resistant film. Alternatively, a solution prepared by dissolving the polyurethane resin in a solvent may be used herein.

In the case of using the dispersion, the polyurethane resin particles preferably have an average size of 50 to 200 nm and more preferably 60 to 200 nm. When the polyurethane resin particles have such an average size, the polyurethane resin particles can be uniformly dispersed in the first and second ink compositions.

Examples of the polyurethane resin include forcibly emulsified polyurethane dispersions such as a polyurethane dispersion, Takelac® W-6061, available from Mitsui Chemicals, Inc. and self-emulsified polyurethane dispersions such as a polyurethane dispersion, Takelac® W-6021, available from Mitsui Chemicals, Inc. and a polyurethane dispersion, WBR-016U, available from Taisei Fine Chemical Co., Ltd., having a glass transition temperature of 20° C.

The content (solid content) of the polyurethane resin in each of the first and second ink compositions is preferably 0.5% to 10% and more preferably 0.5% to 5% on a mass basis. When the content of the polyurethane resin therein is greater than 10% by mass, the first and second ink compositions possibly have low reliability (clogging, ejection stability, or the like) and does not possibly have appropriate properties (viscosity and the like). When the content of the polyurethane resin therein is less than 0.5% by mass, the first and second ink compositions are insufficiently fixed on a recording medium and therefore an image with high rubfastness cannot be formed.

The first and second ink compositions preferably contain at least one selected from the group consisting of alkanediols and glycol ethers. The use of at least one of the alkanediols and the glycol ethers allows the first and second ink compositions to have increased wettability to recording surfaces of recording media and high permeability.

Preferred examples of the alkanediols include 1,2-alkanediols, such as 1,2-butanediol, 1,2-pentanediol, 1,2-hexanediol, 1,2-heptanediol, and 1,2-octanediol, containing four to eight carbon atoms. In particular, 1,2-hexanediol, 1,2-heptanediol, and 1,2-octanediol, which are 1,2-alkanediols containing six to eight carbon atoms, are preferred because these diols have high permeability to recording media.

Examples of the glycol ethers include polyol lower-alkyl ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol monoethyl ether, triethylene glycol monomethyl ether, triethylene glycol monobutyl ether, and tripropylene glycol monomethyl ether. In particular, triethylene glycol monobutyl ether is preferably used because good recording quality can be achieved.

The content of the at least one of the alkanediols and the glycol ethers in each of the first and second ink compositions is preferably 1% to 20% and more preferably 1% to 10% on a mass basis.

The first and second ink compositions preferably contain an acetylene glycol surfactant or a polysiloxane surfactant. The use of the acetylene glycol or polysiloxane surfactant allows the first and second ink compositions to have increased wettability to recording surfaces of recording media and high permeability.

Examples of the acetylene glycol surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. Commercially available examples of the acetylene glycol surfactant include surfactants, Olfine E1010, Olfine STG, and Olfine Y, available from Nissin Chemical Industry Co., Ltd. and surfactants, Surfynol 104, Surfynol 82, Surfynol 465, Surfynol 485, and Surfynol TG, available from Air Products and Chemicals Inc.

Commercially available examples of the polysiloxane surfactant include surfactants, BYK-347 and BYK-348, available from Byk Chemie Japan K.K.

The first and second ink compositions may further contain an anionic surfactant, a nonionic surfactant, a cationic surfactant, an amphoteric surfactant, or another surfactant.

The content of the acetylene glycol or polysiloxane surfactant in each of the first and second ink compositions is preferably 0.01% to 5% and more preferably 0.1% to 0.5% on a mass basis.

The first and second ink compositions preferably contain a polyol. In the case of using the first and second ink compositions for ink jet recording apparatuses, the use of the polyol can prevent the first and second ink compositions from being dried and also can prevent the first and second ink compositions from clogging head portions of the ink jet recording apparatuses.

Examples of the polyol include ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylol ethane, and trimethylol propane.

The content of the polyol in each of the first and second ink compositions is preferably 0.1% to 3.0% and more preferably 0.5% to 2.0% on a mass basis.

The first and second ink compositions preferably contain a ternary amine. The ternary amine functions as a pH regulator and therefore can readily regulate the pH of the first and second ink compositions.

An example of the ternary amine is triethanolamine.

The content of the ternary amine in each of the first and second ink compositions is preferably 0.01% to 10% and more preferably 0.1% to 2% on a mass basis.

The first and second ink compositions preferably contain water such as pure or ultrapure water including ion-exchanged water, ultrafiltered water, reverse osmosis-purified water, or distilled water. In particular, water sterilized by ultraviolet irradiation or the use of hydrogen peroxide is preferred because fungi and bacteria can be prevented from growing therein over a long period of time.

The first and second ink compositions may contain a fixative such as water-soluble rosin, an antimildew or antiseptic agent such as sodium benzoic acid, an anti-oxidation or ultraviolet-absorbing agent such as an allophanate, a chelating agent, an oxygen absorber, or another additive. These additives may be used alone or in combination.

The first and second ink compositions can be each prepared by the same process as that used to prepare a conventional pigment ink using a conventional apparatus such as a ball mill, a sand mill, an attritor, a basket mill, or a roll mill. Coarse particles are preferably removed from the first and second ink compositions with a membrane filter or a mesh filter.

Images can be formed by applying the first and second ink compositions to various recording media. Since the first ink composition contains the metal compound particles, which are made of titanium oxide or the like, and the second ink composition contains the hollow resin particles, a white image having high hiding power can be formed using the first and second ink compositions.

The fabric sheet is used as a recording medium. Examples of the fabric include a woven fabric, a knitted fabric, and a nonwoven fabric. Fibers contained in the fabric sheet are not particularly limited and may be natural fibers such as cotton (for example, sheeting) fibers, silk fibers, hemp fibers, and wool fibers; synthetic fibers such as polyamide fibers, polyester fibers, and acrylic fibers; regenerated or semi-synthetic fibers such as rayon fibers and acetate fibers; and mixtures of these fibers.

In the first and second image-forming steps, various ink jet recording processes can be used. Examples of the ink jet recording processes include thermal ink jet processes, piezoelectric ink jet processes, continuous ink jet processes, roller application processes, and spray application processes.

In the image-forming method, the first and/or second image-forming steps may be performed under heating conditions in view of increasing the fixability of the first and second colorants to the fabric sheet.

At least one of the following tools may be used in the first and second image-forming steps: a hot press, a laminator, a laser, a heating iron, a dryer, an ultraviolet heater, a ceramic heater, an iron, and the like. The heating temperature is preferably, for example, 30° C. to 120° C. and more preferably 50° C. to 100° C. The heating time is preferably, for example, one to 90 seconds and more preferably five to 60 seconds.

The image-forming method has been described above using the example in which the first ink composition and the second ink composition contain the first colorant (the metal compound particles) and the second colorant (the hollow resin particles), respectively, and the first and second colorants are white. The image-forming method is not limited to the example. In the image-forming method, the first ink composition may contain particles of a known organic coloring pigment or other metal compound particles having a color other than white instead of the above metal compound particles and the second ink composition may contain colored hollow resin particles having the same color as that of the metal compound particles having a color other than white instead of the above hollow resin particles, where the colored hollow resin particles need to be light-transmissive. This allows an image having a color other than white and high hiding power to be formed.

EXAMPLE

The present invention is further described below in detail with reference to Example. The present invention is not limited to Example.

A first white ink composition (an undercoat ink) and a second white ink composition (an image-forming ink) were each prepared by the following procedure: hollow resin particles, metal compound particles, a resin dispersion, an organic solvent, a polyol, a ternary amine, a surfactant, and ion-exchanged water were mixed at a ratio shown in Table 1; the mixture was filtered through a metal filter with a pore size of 5 μm; and the obtained filtrate was degassed with a vacuum pump. Values shown in Table 1 are in mass percent.

TABLE 1

| Components | Undercoat ink | Image-forming ink |
|---|---|---|
| Hollow resin particles (SX8782(D)) | — | 10.0 |
| Metal compound particles (titanium oxide, NanoTek(R) Slurry) | 10.0 | — |
| U-1 | — | 5.0 |
| U-2 | 5.0 | — |
| Glycerin | 10.0 | 10.0 |
| 1,2-hexanediol | 3.0 | 3.0 |
| Triethanolamine | 0.5 | 0.5 |
| BYK-348 | 0.5 | 0.5 |
| Ion-exchanged water | Balance | Balance |
| Total | 100.0 | 100.0 |

Components shown in Table 1 are described below.

The hollow resin particles used were those contained in an aqueous dispersion, SX8782(D), commercially available from JSR Corporation and had an outside diameter of 1.0 μm and an inside diameter of 0.8 μ. The aqueous dispersion had a solid concentration of 28%.

The metal compound particles used were those contained in a commercial slurry, NanoTek® Slurry, available from C. I. Kasei Co., Ltd. The slurry contained 15% titanium oxide particles with an average size of 36 nm.

U-1 shown in Table 1 is a self-emulsified dispersion, containing a polycarbonate-based anionic polyurethane resin having a glass transition temperature of −70° C., having an average particle size of 130 μm.

U-1 was prepared as described below. In a reaction vessel, 1 mol of polycarbonate with a number-average molecular weight of 2,000 and 0.7 mol of 1,6-hexanediol were dissolved in dimethylformamide (DMF), whereby a 30% DMF solution was prepared. To the 30% DMF solution, 1.7 mol of 4,4-diphenylmethane diisocyanate was added, whereby a mixture with an NCO/OH molar ratio of 1.0 was prepared. The mixture was subjected to reaction at 100° C. until the 2,270 cm$^{-1}$ peak, due to free isocyanate groups, was not observed in an ultraviolet absorption spectrum, whereby a polyurethane resin solution was prepared. The polyurethane resin solution was dispersed in water by a known process, whereby an aqueous polyurethane resin dispersion, U-1, having a solid content of 40% and a viscosity of 20 to 800 mPa·s at 25° C. was obtained.

U-2 shown in Table 1 is a self-emulsified dispersion containing a polyether-based anionic polyurethane resin, Resamine D2020, available from Dainichiseika Color & Chemicals Mfg. Co., Ltd. This dispersion has an average particle size of 100 μm. This resin has a glass transition temperature of −30° C.

BYK-348 shown in Table 1 is a polysiloxane surfactant available from Byk Chemie Japan K.K.

The undercoat ink shown in Table 1 was loaded into a black ink chamber of an ink cartridge intended for use in an ink jet printer, PX-G930, available from Seiko Epson Corporation. The ink cartridge was installed in the ink jet printer and then used for printing.

A solid pattern with a duty of 100% was printed on a fabric (100% cotton sheeting) at a resolution of 720×720 dpi.

The image-forming ink shown in Table 1 was loaded into another ink chamber of the ink cartridge other than the black ink chamber and then used for printing.

Another solid pattern with a duty of 100% was printed on a undercoat layer formed on the fabric at a resolution of 720×720 dpi.

The term "duty" as used herein is defined by the following equation:

$$D = N/(V \times H) \times 100$$

wherein D is the duty in percent, N is the number of printed dots per unit area, V is the vertical resolution per unit area, and H is the horizontal resolution per unit area. A duty of 100% corresponds to the maximum mass of a single color ink.

The printed fabric was dried at room temperature for one hour. A print on the dried fabric was sensorially evaluated for hiding power in such a manner that light was applied to the back of the print. As a result, the print was evaluated to be A. Evaluation standards were as described below.

A: White
B: Slightly transmissive
C: Transmissive

Comparative Example 1

A print was prepared in substantially the same manner as that described in Example except that no undercoat ink was used. The print was evaluated to be C.

Comparative Example 2

A print was prepared in substantially the same manner as that described in Example except that no undercoat ink was used and printing was performed twice using the image-forming ink. The print was evaluated to be B.

Comparative Example 3

A print was prepared in substantially the same manner as that described in Example except that no image-forming ink was used and printing was performed twice using the undercoat ink. The print was evaluated to be C.

The result of Example shows that an image-forming method according to the present invention is capable of providing a print with good hiding power.

The results of Comparative Examples 1 to 3 show that in the case of lacking either one of the undercoat ink and the image-forming ink, desired hiding power cannot be achieved independently of the number of times printing is performed.

The present invention is not limited to the above embodiments and various modifications can be made. The present invention covers configurations (for example, configurations substantially equivalent in function, process, and result to or configurations substantially equivalent in purpose and effect to) substantially equivalent to those described in the embodiments. The present invention covers configurations formed by replacing nonessential portions of the configurations described in the embodiments with others. The present invention covers configurations capable of providing the same advantages as those of the configurations described in the embodiments or capable of achieving the same objects as those of the configurations described in the embodiments. Furthermore, the present invention covers combinations of the configurations described in the embodiments and known techniques.

What is claimed is:

1. An image-forming method comprising:
    a first image-forming step of forming an image on a fabric sheet with a first ink composition; and
    a second image-forming step of forming an image on the fabric sheet with a second ink composition subsequently to the first image-forming step,
    wherein the first ink composition contains a first colorant, the second ink composition contains a second colorant, and the first colorant has an average particle size less than that of the second colorant.

2. The image-forming method according to claim 1, wherein the first colorant is metal compound particles and the second colorant is hollow resin particles.

3. The image-forming method according to claim 2, wherein the metal compound particles have an average size of 200 nm or less.

4. The image-forming method according to claim 2, wherein the hollow resin particles have an average size of 500 nm or more.

5. The image-forming method according to claim 2, wherein the metal compound particles comprise titanium oxide.

6. The image-forming method according to claim 2, wherein each of the first and second colorants is a white colorant and the second image is formed atop the first image to form a resultant white image, and wherein the respective particle sizes of the first and second colorant are such that the resultant white image transmits less light than an image that is formable on the fabric sheet by forming both the first and second images with the first ink composition or second ink composition alone.

7. The image-forming method according to claim 1, wherein the content of the first colorant in the first ink composition and the content of the second colorant in the second ink composition are 1% to 20% by mass.

8. The image-forming method according to claim 1, wherein the first and second ink compositions contain a dispersion containing a polyurethane resin.

9. The image-forming method according to claim 1, wherein the first and/or second image-forming step is performed under heating conditions.

10. The image-forming method according to claim 1, wherein the first and second ink compositions further contain at least one selected from the group consisting of alkanediols and glycol ethers.

11. The image-forming method according to claim 1, wherein the first and second ink compositions further contain an acetylene glycol surfactant or a polysiloxane surfactant.

12. The image-forming method according to claim 1, wherein each of the first and second image-forming steps are performed by ink jet recording.

13. A record obtained by the image-forming method according to claim 1.

14. The image-forming method according to claim 1, wherein each of the first and second colorants is a white colorant and the second image is formed atop the first image to form a resultant white image, and wherein the respective particles sizes of the first and second colorant are such that the resultant white image transmits less light than an image that is formable on the fabric sheet by forming both the first and second images with the first ink composition or second ink composition alone.

15. An image-forming method comprising the steps of:
(a) forming a first image on a fabric sheet with a first ink composition comprising a first colorant; and
(b) after the first image has been formed on the fabric sheet, forming a second image atop the first image formed on the fabric sheet in step (a), the second image being formed with a second ink composition that is different from the first ink composition, said second ink composition comprising a second colorant, each of the first and second colorants comprising particles with the particles of the first colorant having an average particle size that is less than an average particle size of the particles of the second colorant.

16. The image-forming method according to claim 15, wherein each of the first and second colorants is a white colorant and the formation of the second image atop the first image on the fabric sheet in step (b) results in a white image, wherein the respective particle sizes of the particles of the first and second colorant are such that the resultant white image transmits less light than an image that is formable on the fabric sheet by forming both the first and second images with the first ink composition or second ink composition alone.

17. The image-forming method according to claim 16, wherein the first colorant comprises metal compound particles and the second colorant comprises hollow resin particles.

* * * * *